(12) United States Patent
Jahn et al.

(10) Patent No.: US 9,291,269 B2
(45) Date of Patent: Mar. 22, 2016

(54) INTERSHAFT SEAL

(71) Applicant: ROLLS-ROYCE PLC, London (GB)

(72) Inventors: Ingo Henry Johannes Jahn, West End (AU); Christopher Davies, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 13/959,041

(22) Filed: Aug. 5, 2013

(65) Prior Publication Data

US 2014/0049009 A1     Feb. 20, 2014

(30) Foreign Application Priority Data

Aug. 14, 2012 (GB) .................................. 1214472.1

(51) Int. Cl.
| | | |
|---|---|---|
| *F16J 15/34* | (2006.01) | |
| *F16J 15/30* | (2006.01) | |
| *F16J 15/26* | (2006.01) | |
| *F16J 15/44* | (2006.01) | |

(52) U.S. Cl.
CPC .................. *F16J 15/30* (2013.01); *F16J 15/26* (2013.01); *F16J 15/3452* (2013.01); *F16J 15/3464* (2013.01); *F16J 15/441* (2013.01)

(58) Field of Classification Search
USPC .......... 277/361, 306, 362, 363, 370, 399, 400
See application file for complete search history.

(56) References Cited

U.S. PATENT DOCUMENTS

| | | | | |
|---|---|---|---|---|
| 2,884,268 A | * | 4/1959 | Amirault et al. ............. | 277/362 |
| 3,035,841 A | * | 5/1962 | Riester ........................ | 277/362 |
| 3,315,968 A | * | 4/1967 | Hanlon ........................ | 277/361 |
| 3,321,043 A | * | 5/1967 | Vaughn ....................... | 184/109 |
| 3,499,653 A | * | 3/1970 | Gardner ....................... | 277/362 |
| 4,323,255 A | * | 4/1982 | Wiese ......................... | 277/362 |
| 4,489,951 A | * | 12/1984 | Kataoka et al. .............. | 277/362 |
| 4,889,348 A | * | 12/1989 | Amundson et al. .......... | 277/306 |
| 4,972,986 A | * | 11/1990 | Lipschitz .................... | 277/361 |
| 5,217,233 A | * | 6/1993 | Pecht et al. .................. | 277/306 |
| 5,941,531 A | * | 8/1999 | Parker et al. ................. | 277/369 |
| 5,947,479 A | * | 9/1999 | Ostrowski ................... | 277/306 |
| 6,932,348 B2 | * | 8/2005 | Takahashi .................... | 277/359 |
| 8,408,555 B2 | * | 4/2013 | Garrison ..................... | 277/306 |
| 2010/0164180 A1 | * | 7/2010 | Short .......................... | 277/370 |

(Continued)

FOREIGN PATENT DOCUMENTS

| | | |
|---|---|---|
| EP | 2 420 649 A2 | 2/2012 |
| EP | 2 508 780 A1 | 10/2012 |
| WO | WO 2010/030448 A1 | 3/2010 |

OTHER PUBLICATIONS

British Search Report issued in British Patent Application No. GB1214472.1 on Oct. 30, 2012.

(Continued)

*Primary Examiner* — Kristina Fulton
*Assistant Examiner* — Eugene G Byrd
(74) *Attorney, Agent, or Firm* — Oliff PLC (57) ABSTRACT

An intershaft seal is provided for inner and outer coaxial shafts which rotate relative to each other. The seal is located in an annular space between the shafts and maintains an axial pressure differential between a fluid pressure on the first side of the seal and a different fluid pressure on the other, second side of the seal. The seal includes a first runner which extends circumferentially around a first one of the shafts and projects therefrom into the annular space. The seal further includes a sealing ring which is coaxial with the shafts.

20 Claims, 5 Drawing Sheets

(56) References Cited

U.S. PATENT DOCUMENTS

2012/0043725 A1* 2/2012 Jahn et al. .................... 277/306
2012/0217703 A1* 8/2012 Garrison ....................... 277/361

OTHER PUBLICATIONS

Nov. 20, 2013 Search Report issued in European Patent Application No. 13 17 9252.

* cited by examiner

INTERSHAFT SEAL

FIELD OF THE INVENTION

The present invention relates to an intershaft seal.

BACKGROUND OF THE INVENTION

Numerous types of intershaft seal can be used to seal between relatively rotating coaxial shafts as found e.g. in gas turbine engines. One type of intershaft seal is shown schematically in FIG. 1 and is used to seal between gas, liquid or air-gas mixtures. The seal is located between inner 37 and outer 38 coaxial shafts and maintains an axial pressure differential between high pressure fluid 31 on a first side of the seal and low pressure fluid 32 on a second side of the seal. The shafts rotate relative to each other. The seal comprises a carbon ring 35 positioned between first 33 and second 34 runners on respectively the first and second sides of the seal. The carbon ring typically has a slight clearance from the outer shaft at cold build conditions. The two runners are separated by a spacer 36, so that the axial gap between the runners is slightly longer than the axial length of the carbon ring. During operation, the carbon ring is pushed by centrifugal forces into more intimate sealing contact with the outer shaft and rotates with that shaft. First 39 and second 40 annular sealing interfaces are created between the runners and the axially spaced first 46 and second 47 end faces of the ring. The sealing interfaces provide only a small axial clearance between each end face and the respective runner.

The series of first runner 33, spacer 36 and second runner 34 is axially restrained relative to the inner shaft 37 by a ring nut 41 (or similar device) which axially clamps these components against a step formation on the inner shaft. Optionally a Belville spring 42 may be used to set the clamping load. The nut arrangement can be located on the opposite (high pressure) side of the seal to that shown in FIG. 1.

Figure 1:
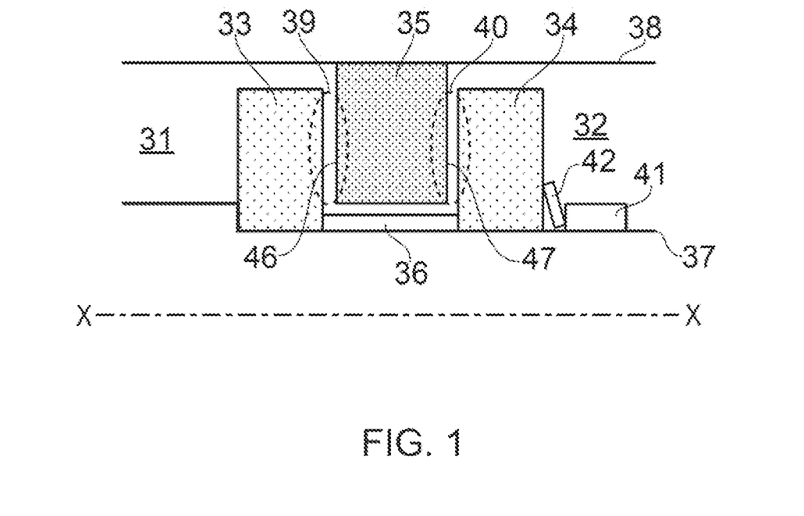
FIG. 1 shows schematically a longitudinal cross-section through an intershaft seal which seals between relatively rotating coaxial shafts.

During axial movement transients, rubbing contact the respective sealing interface 39, 40 can occur, such rubbing contact producing sufficient axial force to overcome the frictional resistance to sliding axial movement of the carbon ring 35 along the outer shaft 38. Wear of the seal occurs due to rubbing at the end faces 46, 47 of the carbon ring where these contact with the runners 33, 34. Thus an improvement to this technology is the incorporation of lift generating formations, such as V-grooves, in the surfaces of the runners at the sealing interfaces 39, 40. Such formations generate lift as the axial clearance of the sealing reduces, thereby causing the ring 35 to move axially. Ideally this lift can be sufficiently strong such that an air film is produced and no axial rubbing contact occurs under normal operation.

When the carbon ring 35 is midway between runners 33, 34, the seals formed by both sealing interfaces 39, 40 can be inadequate, leading to excessive fluid leakage across the seal. However, reducing the distance between the runners is generally not possible, as provision has to be made for thermal expansion of the ring 35 and manufacturing tolerances. More generally, due to insufficient tolerance control or due to wear of the carbon ring 35, the gaps between the carbon ring and the runners 33, 34 vary from seal to seal and also increase with use. Consequently the seal leakage characteristic varies from component to component and with time.

Figure 2:
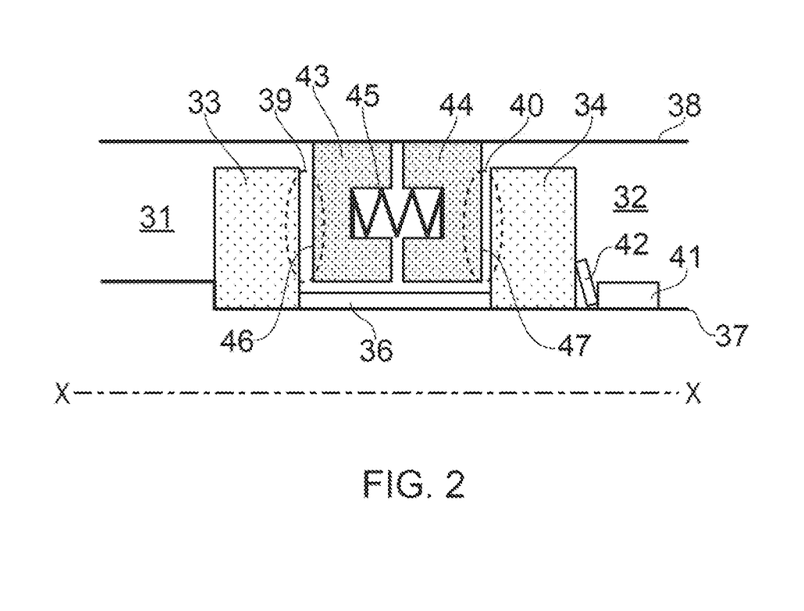
FIG. 2 shows schematically a longitudinal cross-section through another intershaft seal.

A development of the intershaft seal, shown schematically in FIG. 2, has the ring split into two halves 43, 44 with a spring element 45 (e.g. a wave spring) positioned between the two halves and urging the halves towards respectively the first runner and the second runner. If this arrangement is combined with lift generating formations which provide sufficient lift to overcome the spring compressive force and hydrostatic pressure acting on the ring halves 43, 44, an air-riding seal is created. Here, the axial clearances of both sealing interface can be kept to a low level (e.g. as low as 2-5 microns), while no wear occurs. Any thermal expansion and build tolerance imperfections can be compensated for by compression of the spring element. Similarly performance degradation due to carbon ring wear throughout the seal life is eliminated.

A disadvantage of the arrangement shown in FIG. 2, however, is that two ring halves 43, 44 with comparatively complicated shapes need to be manufactured and that it can be difficult to position the spring element 45 between the two halves. Significant assembly complications can also be experienced.

A further problem associated with seals of the type shown in FIGS. 1 and 2 is that due to the centrifugal loading and/or differential thermal expansion, the interference between the carbon ring and the outer shaft increases. Consequently as the seal experiences axial motion and as the carbon ring is required to slide axially relative to the outer shaft, a larger frictional force has to be overcome. If this force becomes too large in the case of an air-riding seal arrangement, the air film may not be able to overcome the frictional force and contact can occur. Alternatively in a contacting seal arrangement, increased contact forces can be encountered between the runners and the carbon ring, leading to increased heat generation and wear.

SUMMARY OF THE INVENTION

In a first aspect, the present invention provides an intershaft seal for inner and outer coaxial shafts which rotate relative to each other, the seal being located in an annular space between the shafts and maintaining an axial pressure differential between a fluid pressure on the first side of the seal and a different fluid pressure on the other, second side of the seal, the seal including.

a first runner which extends circumferentially around a first one the shafts and projects therefrom into the annular space, and a sealing ring which is coaxial with the shafts and has a first end face, the first runner forming a first annular sealing interface with the first end face of the sealing ring;

wherein the sealing ring has a main body portion formed of a first material having a first stiffness, and further has a retaining ring fitted to the radially outward side of the body portion and formed of a second material having a second stiffness, the second stiffness being greater than the first stiffness such that the retaining ring reduces or prevents radial growth of the sealing ring relative to the outer shaft under centrifugal loading.

Due to the higher stiffness of the retaining ring, the radial growth of the sealing ring can be substantially reduced under centrifugal loading, even to the point where the radial growth of the sealing ring is matched to that of the outer shaft such that no relative radial growth occurs. This allows interference or clearance between the sealing ring and the outer shaft to be better controlled such that any centrifugal loading dependence of the frictional force between these components can be reduced or eliminated. Resistance to axial sliding of the sealing ring relative to the outer shaft can thus be controlled. In the case of an air-riding seal arrangement, the air film can thus overcome any frictional force to prevent contact at the annular sealing interface. In the case of a contacting seal arrangement, contact forces between the runner and the sealing ring can be limited to reduce heat generation and wear.

The first material may have a first coefficient of thermal expansion (CTE), and the second material may have a second CTE, the second CTE being higher than the first CTE such that the retaining ring increases radial contraction of the sealing ring relative to the outer shaft on decreasing temperature.

Indeed, in a second aspect, the present invention provides an intershaft seal for inner and outer coaxial shafts which rotate relative to each other, the seal being located in an annular space between the shafts and maintaining an axial pressure differential between a fluid pressure on the first side of the seal and a different fluid pressure on the other, second side of the seal, the seal including:

a first runner which extends circumferentially around a first one the shafts and projects therefrom into the annular space, and a sealing ring which is coaxial with the shafts and has a first end face, the first runner forming a first annular sealing interface with the first end face of the sealing ring;

wherein the sealing ring has a main body portion formed of a first material having a first CTE, and further has a retaining ring fitted to the radially outward side of the body portion and formed of a second material having a second CTE, the second CTE being higher than the first CTE such that the retaining ring increases radial contraction of the sealing ring relative to the outer shaft on decreasing temperature.

Due to the higher CTE of the retaining ring the radial contraction of the sealing ring can be substantially increased. This can be particularly beneficial on cold starts when the seal temperature may be substantially lower than the temperature (typically room temperature) at which the sealing ring is fitted to the shafts. In this way, interference or clearance between the sealing ring and the outer shaft can be better controlled. More generally, as the CTE of the shafts is typically higher than the CTE of the main body portion of the sealing ring, having a relatively high CTE for the retaining ring can help to better match the overall CTE of the sealing ring to the CTE of the shafts.

Further aspects of the present invention provide: (i) coaxial inner and outer shafts fitted with the intershaft seal of the first aspect, and (ii) a gas turbine engine having such coaxial inner and outer shafts.

Optional features of the invention will now be set out. These are applicable singly or in any combination with any aspect of the invention.

Typically, the first shaft is the inner shaft. However, in other arrangements the first shaft can be the outer shaft. In these arrangements, it may then be desirable for the sealing ring to have a further retaining ring fitted to the radially inward side of the main body portion. The further retaining ring can be formed of a material having a stiffness that is greater than the first stiffness to reduce or prevent radial growth of the sealing ring relative to the inner shaft under centrifugal loading. The further retaining ring can be formed of a material having a CTE that is greater than the first CTE to increase radial contraction of the sealing ring relative to the inner shaft on decreasing temperature.

The seal may further include a second runner which extends circumferentially around the first shaft and projects therefrom into the annular space, the sealing ring being located in a cavity formed between the runners and having a second end face axially spaced from the first end face. The second runner can then form a second annular sealing interface with the second end face of the sealing ring.

Another option, however, is for the seal to have only one (i.e. the first) annular sealing interface. The seal may then have a mounting formation (e.g. provided by the outer shaft) which controls the axial position of the sealing ring relative to the runner. For example, in a seal in which there is rubbing contact at the annular sealing interface, the mounting formation may be a step or abutment which prevents the sealing ring from moving axially away from the runner. The step or abutment may contact the sealing ring directly, or contact may be indirect and mediated e.g. by a spacer or spacers. In a seal in which a fluid film is generated at the sealing interface, the mounting formation may also include a biasing arrangement (e.g. a spring element or bellows) which urges the sealing ring towards the runner.

The main body portion can be a unitary body. In cases when the seal has first and second annular sealing interfaces, due to improved performance provided by the retaining ring, it may then be possible to avoid forming the body portion as a more complicated arrangement in which the body if formed as two body halves with a spring element positioned therebetween (i.e. in the manner of FIG. 2).

The sealing ring can, in use, make rubbing contact with the or each runner at the respective sealing interface. Alternatively, lift generating formations can be formed at the or each end face of the sealing ring and/or at the opposing face of the respective runner such that, in use, a fluid film is generated at the or each sealing interface.

Generally the main body portion provides the first and, if present, the second end face.

The main body portion may be formed of carbon or ceramic.

The retaining ring may be formed of metal or fibre reinforced composite material. Composite material, such carbon fibre reinforced plastic, can reduce the weight of the component but may be restricted to use in relatively low temperature applications.

The sealing ring may further include a first anti-rotation formation which cooperates with a corresponding second anti-rotation formation of the outer shaft to prevent or restrict rotation of the sealing ring relative to the outer shaft but to allow limited axial movement of the sealing ring relative to the outer shaft. The formations allow the sealing ring to rotate with the outer shaft relative to the inner shaft. Conveniently, the first anti-rotation formation can be provided by the retaining ring. One of the anti-rotation formations can provide one or more male elements which mate with one or more corresponding female elements provided by the other anti-rotation formation. For example, the formations can take the form of interlocking spline, dog, tab or keyway arrangements. Another option, however, is for first anti-rotation formation to be an arrangement of one or more flexible members (such as torsional springs) which extend from the sealing ring to the outer shaft, and the second anti-rotation formation to be an arrangement of corresponding attachment fixtures for the flexible members to the outer shaft, wherein the flexible members allow restricted rotation of the sealing ring relative to the outer shaft.

The sealing ring may further include one or more secondary seals which seal between the sealing ring and the outer shaft. The secondary seals can be particularly beneficial when there is a clearance between the sealing ring and the outer shaft. A secondary seal can be carried by the sealing ring, e.g. by the retaining ring, or a secondary seal can be carried by the outer shaft. Another option is for a secondary seal to be an annular bellows formation having ends which are fixed to respectively the sealing ring and the outer shaft. Such a bellows formation can also function as an anti-rotation device which prevents rotation of the sealing ring relative to the outer shaft but allows limited axial movement of the sealing ring relative to the outer shaft.

Conveniently, the retaining ring can be an interference fit to the sealing ring. For example, the retaining ring can be a shrink fit (when the retaining ring is heated prior to fitting), an expansion fit (when the body portion is cooled prior to fitting), a press fit, or a combination of any two or more such fits. Another option is for the retaining ring to be formed as a plurality of arc sections which can be individually located on the retaining ring and then joined together to complete the ring.

Further optional features of the invention are set out below.

BRIEF DESCRIPTION OF THE DRAWINGS

Embodiments of the invention will now be described by way of example with reference to the accompanying drawings in which:

FIGS. 5($a$) and ($b$) show respectively schematic transverse and longitudinal sections through a sealing ring of the seal of FIG. 4;

FIGS. 6($a$) and ($b$) show respectively schematic transverse and longitudinal sections through another sealing ring;

FIGS. 8($a$) and ($b$) are radially inward directed views of the sealing ring of the seal of FIG. 7 for different axial positions of the sealing ring;

DETAILED DESCRIPTION AND FURTHER OPTIONAL FEATURES OF THE INVENTION

Figure 3:
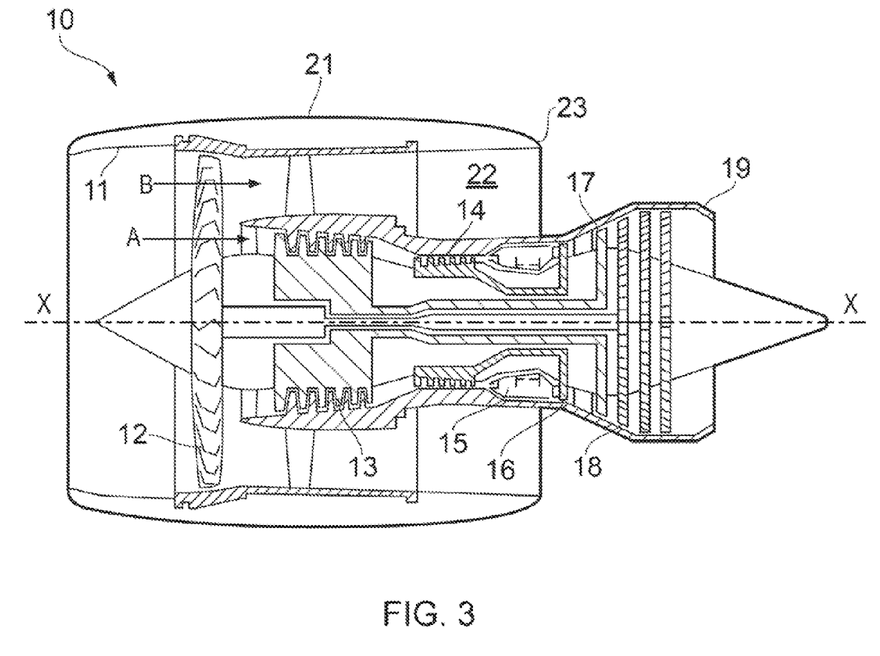
FIG. 3 shows schematically a known longitudinal cross-section through a ducted fan gas turbine engine.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 4:
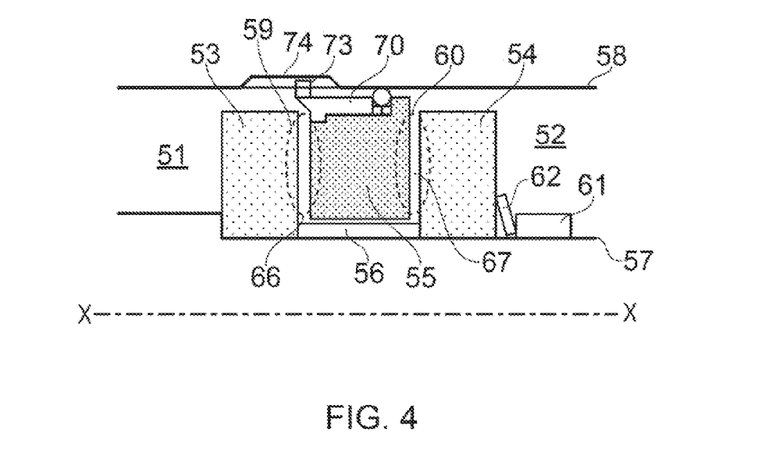
FIG. 4 shows schematically a longitudinal cross-section through an intershaft seal which can be used to seal between interconnecting shafts of the engine of FIG. 3.
Figure 5A:
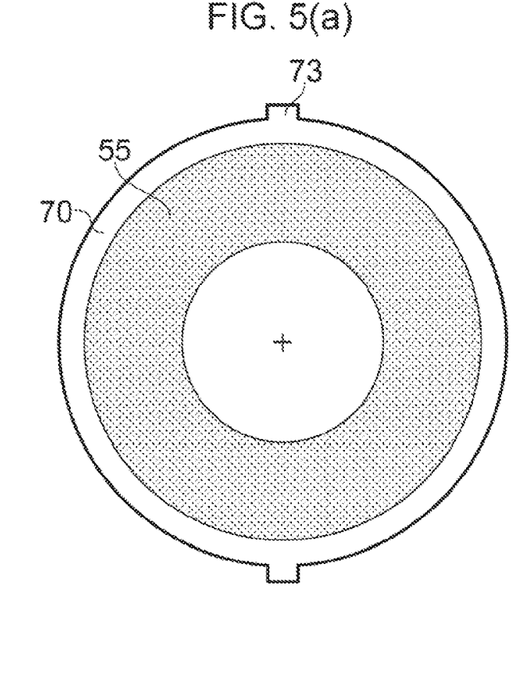
Figure 5B:
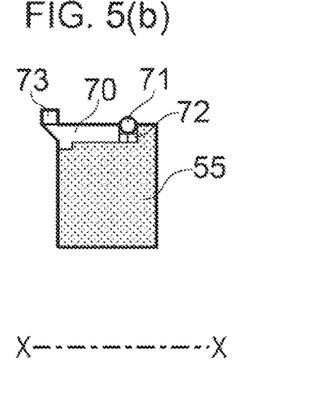

FIG. 4 shows schematically a longitudinal cross-section through an intershaft seal which can be used to seal between two of the interconnecting shafts of the engine of FIG. 3. FIGS. 5($a$) and ($b$) show respectively schematic transverse and longitudinal sections through a sealing ring of the seal.

The seal is located between inner 57 and outer 58 coaxial shafts and maintains an axial pressure differential between high pressure air 51 on a first side of the seal and low pressure air 52 on a second side of the seal. The sealing ring of the seal has a carbon body 55 which is positioned between first 53 and second 54 runners on respectively the first and second sides of the seal (although for certain applications the carbon body 55 can be replaced by a body formed of ceramic, or indeed another material). The two runners are separated by a spacer 56, and the axial gap between the runners is slightly longer than the axial length of the carbon body. First 59 and second 60 annular sealing interfaces are created between the runners and the axially spaced first 66 and second 67 end faces of the carbon body. The sealing interfaces provide only a small axial clearance between each end face and the respective runner. Lift generating formations may be formed on the surfaces of the runners 53, 54 at the annular sealing interfaces.

The first runner 53, spacer 56 and second runner 54 are axially restrained relative to the inner shaft 57 by a ring nut 61 (or similar device) which axially clamps these components against a step formation on the inner shaft. An optional Belville spring 62 may be used to set the clamping load.

The carbon body 55 has a relatively low Young's modulus, and of itself would tend to expand relative to the outer shaft 58 under rotation due to centrifugal loads. Such expansion would only be stopped by the carbon body being pushed into contact with the outer shaft, giving rise to a contact force which increases as the centrifugal force acting on the carbon ring increases. Such contact forces can be large, especially as centrifugal force increases with speed squared.

Accordingly, the sealing ring also has a retaining ring 70 fitted to the outer surface of the carbon body 55. The retaining ring is made from a relatively high Young's modulus material such as steel, titanium alloy, nickel based superalloy (for higher temperature applications) or carbon fibre reinforced composite (for lower temperature applications). The centrifugal forces acting on the carbon body are counteracted by a hoop stress in the retaining ring. Thus, due to its higher stiffness, the retaining ring reduces or prevents radial growth of the sealing ring relative to the outer shaft 58 under centrifugal loading. Generally, the material of the retaining ring also has a substantially higher strength than that of the carbon body.

The carbon body 55 and retaining ring 70 can be configured such that a light interference fit is generated between the retaining ring and the outer shaft 58.

However, another option is to configure the carbon body and the retaining ring to have a small clearance between the ring and the outer shaft. During axial movements of the sealing ring, little or no contact forces then need to be overcome. To ensure a seal is maintained in such an arrangement, a secondary seal 71 can be fitted into the gap between the retaining ring 70 and the outer shaft 58. Conveniently, the secondary seal can be carried by the retaining ring, e.g. in a circumferential groove 72 formed on the outside of the ring. Alternatively, however, the secondary seal can be carried by the outer shaft, e.g. so that it rubs against a smooth surface on the outer diameter of the sealing ring.

The material of the retaining ring 70 typically also has a higher CTE than that of the carbon body 55. This can help to maintain the light interference fit or small clearance of the retaining ring and the outer shaft 58 at cold starts, when the temperature of the seal shay be substantially below 0° C.

Figure 6A:
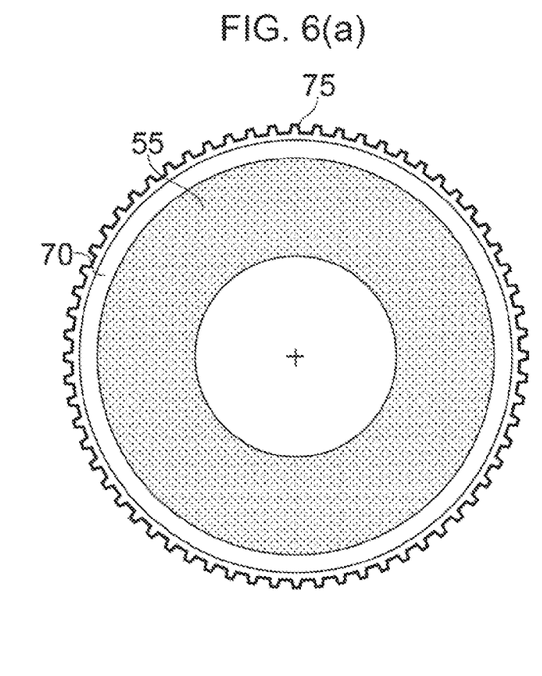
Figure 6B:
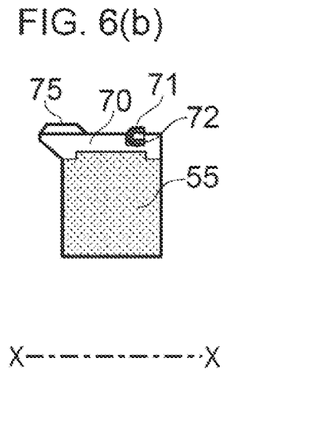

Generally the sealing ring and outer shaft 58 have corresponding anti-rotation formations, so that the sealing ring can rotate at the same speed as the shaft. For example, as shown in FIGS. 4 and 5, radial tabs 73 projecting from the outer side of the retaining ring 70 can run in axially extending grooves 74 formed in the outer shaft 58. The formations can also take the form of splines 75 on the outer surface of the retaining ring which fit in corresponding grooves formed in the outer shaft, as shown in FIGS. 6(a) and (b). The rotational contact between the anti-rotation formations creates some contact friction resistance to axial sealing ring movement, but this resistance is generally substantially lower than the resistance to axial movement from centrifugal loading discussed above in relation to FIGS. 1 and 2. Other possible forms for the anti-rotation formations include dogs and keyways.

Typically, the anti-rotation formations are positioned so that during axial movement of the sealing ring the secondary seal 71 does not run over the formation of the outer shaft 58.

The secondary seal 71 and/or the anti-rotation formations also help to maintain the sealing ring coaxial to the outer shaft 58.

Figure 7:
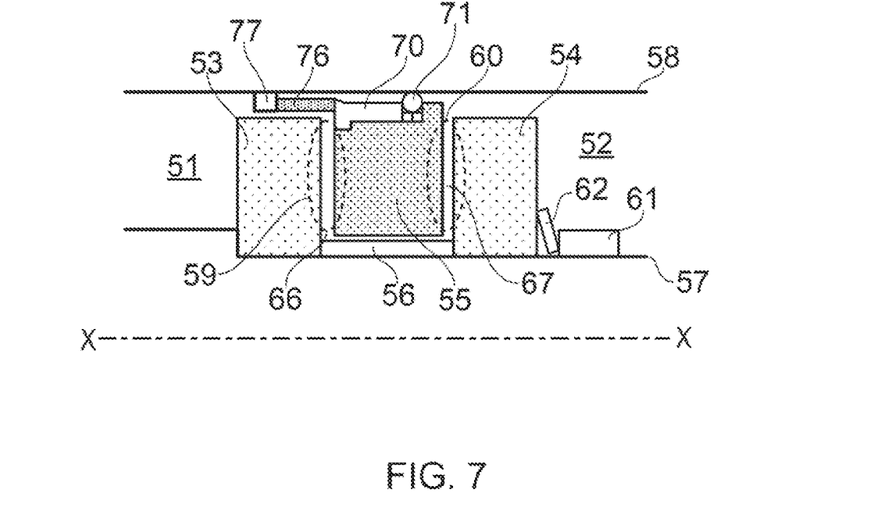
FIG. 7 shows schematically a longitudinal cross-section through another intershaft seal.
Figure 8:
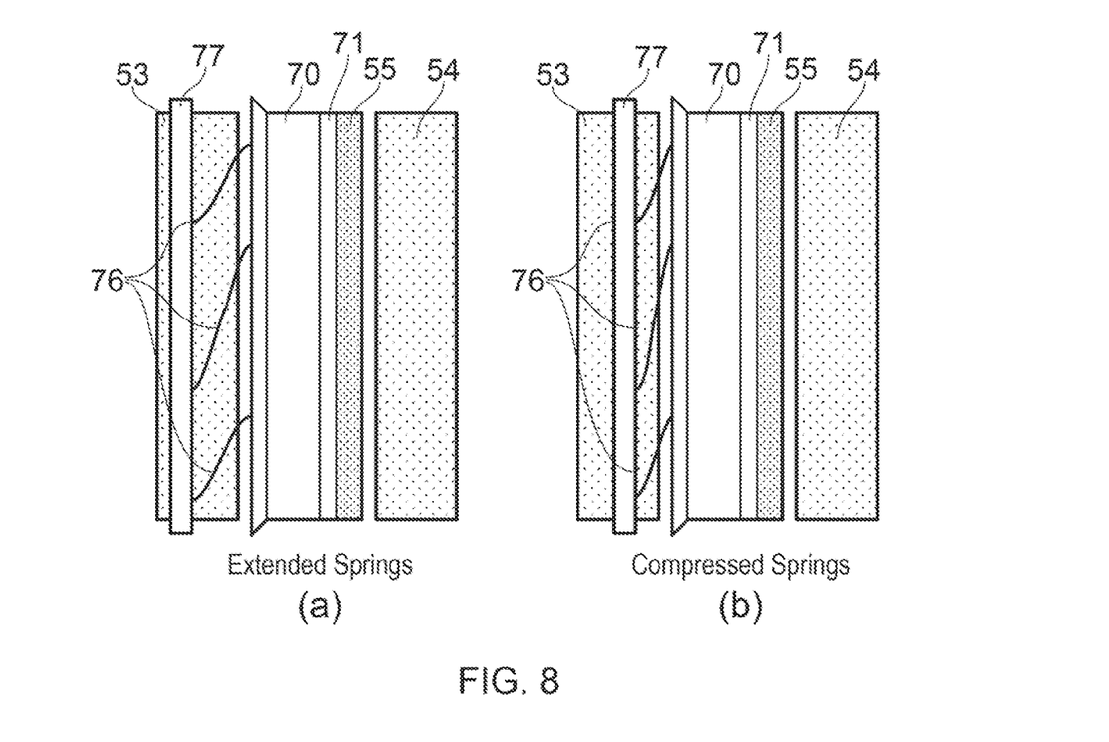

FIG. 7 shows schematically a longitudinal cross-section through another intershaft seal, and FIGS. 8(a) and (b) are radially inward directed views of the sealing ring of the seal. In this case, the anti-rotation formation of the sealing ring takes the form of a plurality of circumferentially distributed torsion springs 74 attached at first ends to the retaining ring 70. The corresponding anti-rotation formation is provided by attachment fixtures for the other ends of the springs, the fixtures being circumferentially distributed along a ring-shaped land 75 of the outer shaft 58. In the views of FIGS. 8(a) and (b) this ring-shaped land is shown, although it is not part of the sealing ring.

The torsion springs 74 ensure that the sealing ring rotates with the otter shaft 58, while allowing relative axial movement between the sealing ring and the outer shaft. In particular, as the axial position of the sealing ring changes, the springs are deflected to take a more axial shape (FIG. 8(a)) or a more tangential shape (FIG. 8(b)). The springs also help to centre the sealing ring relative to the outer shaft.

Various other configurations for the retaining ring 70 are possible. The rings shown in FIGS. 4 and 7 can be axially press-fitted onto the carbon body 55, while the ring shown in FIG. 6 extends over both ends of the carbon ring and can be shrink-fitted onto the body. Split assemblies can also be envisaged in which the retaining ring is formed as a plurality of arc sections (e.g. two halves) which are positioned on the carbon body and then joined together, e.g. by mechanical fasteners, to complete the ring.

Another option (not illustrated) is to provide an annular bellows formation having ends which are fixed to respectively the sealing ring (e.g. at the retaining ring) and the outer shaft. Such a bellows formation can allow the sealing ring to move axially relative to the outer shaft, while combining the functions of the secondary seal and the anti-rotation formations discussed above in respect of FIGS. 4 to 8.

Figure 9:
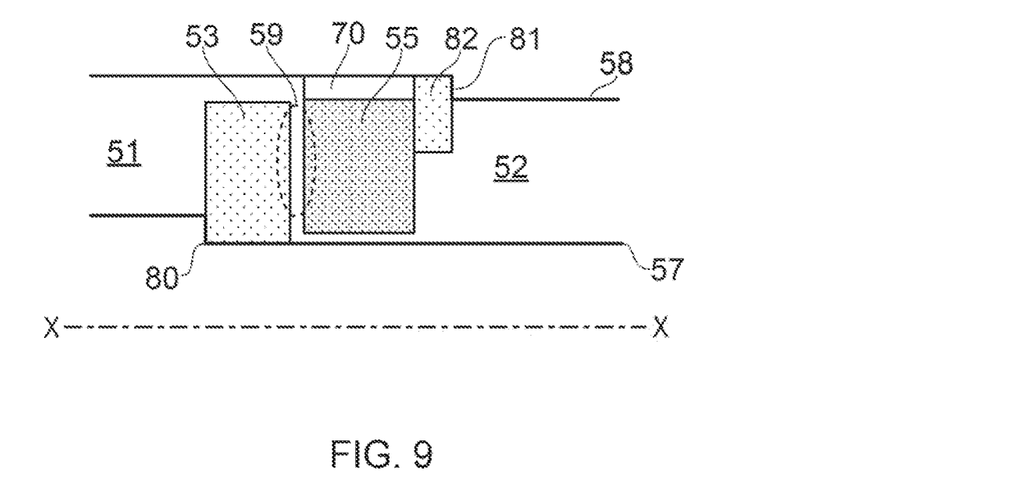
FIG. 9 shows schematically a longitudinal cross-section through another intershaft seal.

FIG. 9 shows schematically a longitudinal cross-section through another intershaft seal. Again, the seal has a sealing ring with a carbon body 55 which is located between inner 57 and outer 58 coaxial shafts and maintains an axial pressure differential between high pressure air 51 on a first side of the seal and low pressure air 52 on a second side of the seal. In this case, however, there is only one runner 53. A rubbing contact annular sealing interface 59 is created between the runner and an end face of the carbon body 55.

A step formation 80 at the inner shaft 57 axially restrains the runner 53 at one side of the seal, and a step formation 81 at the outer shaft 58 and spacer 82 axially restrain the sealing ring at the other side of the seal.

Other features of the seal of FIG. 9 can be similar to those of FIGS. 4 to 8. Thus the sealing ring has a retaining ring 70 fitted to the outer surface of the carbon body 55. A light interference fit or small clearance is generated between the retaining ring and the outer shaft 58. The retaining ring is made from a relatively high Young's modulus material which reduces or prevents radial growth of the sealing ring relative to the outer shaft 58 under centrifugal loading. The material of the retaining ring 70 typically also has a higher CTE than that of the carbon body 55. Anti-rotation formations (not shown) and/or a secondary seal (not shown) can be adopted.

Figure 10:
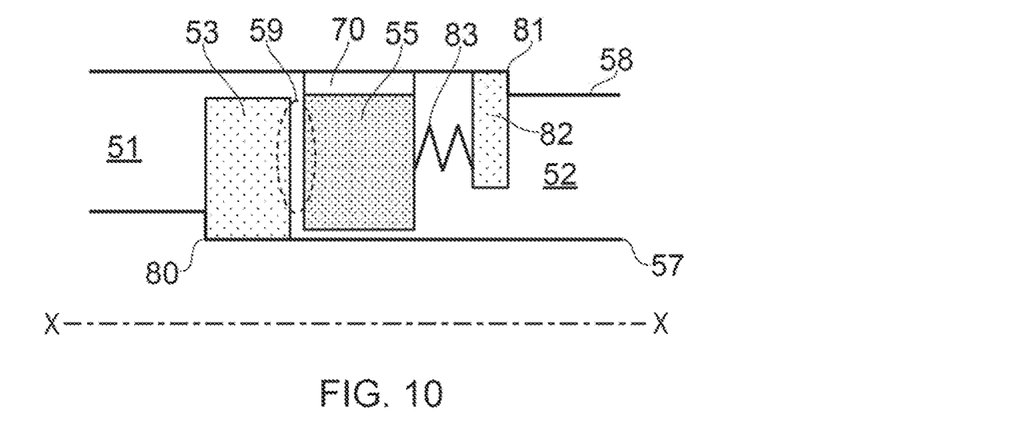
FIG. 10 shows schematically a longitudinal cross-section through another intershaft seal.

FIG. 10 shows a variant on the intershaft seal of FIG. 9. In the variant a spring element 83, such as a wave spring, is positioned between the sealing ring and the spacer 82 and urges the ring towards the runner 53. An air-riding seal is created at the sealing interface 59 by lift generating formations at the end face of the carbon body 55 and/or at the opposing face of the runner. The lift produced by these formations is sufficient to counteract the spring element compressive force.

The retaining ring described above advantageously allows the axial force required to slide the sealing ring to be reduced (or eliminated) and to become largely independent of rotational speed. It can also help to avoid changes to sealing ring/shaft clearances or interference fits caused by differential thermal effects. In addition, the retaining ring can function as an anti-rotation feature and can provide a convenient mounting position for a secondary seal to seal the gap that may be formed between the retaining ring and the outer shaft. The carbon (or ceramic or other material) main body of the sealing ring is generally low strength and brittle and the retaining ring can also provide support and strengthening to reduce the risk of seal failure due to cracking or fracture of the body.

While the invention has been described in conjunction with the exemplary embodiments described above, many equivalent modifications and variations will be apparent to those skilled in the art when given this disclosure. For example, it is possible for the runner or runners to be axially restrained on the outer shaft. In this case, however, the sealing ring would generally have retaining rings at both inner and outer surfaces of the carbon body in order to control centrifugal loading and/or differential thermal effects at both inner and outer sides of the body. Accordingly, the exemplary embodiments of the invention set forth above are considered to be illustrative and not limiting. Various changes to the described embodiments may be made without departing from the spirit and scope of the invention.

The invention claimed is:

1. An assembly, the assembly comprising:
   a rotatable inner shaft;
   a rotatable outer shaft, wherein the rotatable inner shaft and the rotatable outer shaft are coaxial, and the rotatable inner shaft and the rotatable outer shaft both rotate relative to each other;
   an intershaft seal that is located in an annular space between the rotatable inner shaft and the rotatable outer shaft, wherein the intershaft seal maintains an axial pressure differential between a fluid pressure on a first side of the intershaft seal and a different fluid pressure on a second side of the intershaft seal, the intershaft seal including:
- a first runner which extends circumferentially around one of the rotatable inner shaft and the rotatable outer shaft and projects therefrom into the annular space, and
- a sealing ring which is coaxial with both the shaft and the rotatable outer shaft and has a first end face, the first runner forming a first annular sealing interface with the first end face of the sealing ring,
- wherein the sealing ring has a main body portion formed of a first material having a first stiffness,
- a retaining ring fixedly fitted to a radially outward side of the main body portion of the sealing ring and formed of a second material having a second stiffness, the second stiffness being greater than the first stiffness such that the retaining ring reduces or prevents radial growth of the sealing ring relative to the rotatable outer shaft under centrifugal loading, the retaining ring having a first anti-rotation formation projecting from an outer side of the retaining ring, wherein an outer surface of the retaining ring and the first anti-rotation formation opposes an inner surface of the rotatable outer shaft.

2. The assembly according to claim 1, wherein the first material has a first coefficient of thermal expansion, and the second material has a second coefficient of thermal expansion, the second coefficient of thermal expansion being higher than the first coefficient of thermal expansion such that the retaining ring increases radial contraction of the sealing ring relative to the rotatable outer shaft on decreasing temperature.

3. The assembly according to claim 1, wherein the one of the rotatable inner shaft and the rotatable outer shaft is the rotatable inner shaft.

4. The assembly according to claim 1, wherein the intershaft seal further includes a second runner which extends circumferentially around the one of the rotatable inner shaft and the rotatable outer shaft and projects therefrom into the annular space, the sealing ring being located in a cavity formed between the first and second runners and having a second end face axially spaced from the first end face of the sealing ring, and the second runner forming a second annular sealing interface with the second end face of the sealing ring.

5. The assembly according to claim 1, wherein the main body portion is formed of carbon or ceramic.

6. The assembly according to claim 1, wherein the retaining ring is formed of metal or fibre reinforced composite material.

7. The assembly according to claim 1, wherein the first anti-rotation formation on the outer side of the retaining ring cooperates with a corresponding second anti-rotation formation of the rotatable outer shaft to prevent or restrict rotation of the sealing ring relative to the rotatable outer shaft but to allow limited axial movement of the sealing ring relative to the rotatable outer shaft.

8. The assembly according to claim 7, wherein one of the anti-rotation formations provides one or more male elements which mate with one or more corresponding female elements provided by the corresponding second anti-rotation formation.

9. The assembly according to claim 7, wherein the first anti-rotation formation is an arrangement of one or more flexible members which extend from the sealing ring to the rotatable outer shaft, and the second anti-rotation formation is an arrangement of corresponding attachment fixtures for the flexible members to the rotatable outer shaft, wherein the flexible members allow restricted rotation of the sealing ring relative to the rotatable outer shaft.

10. The assembly according to claim 1, further including one or more secondary seals which seal between the sealing ring and the rotatable outer shaft.

11. The assembly according to claim 10, wherein the one or more secondary seal are annular bellows formations having ends which are fixed to respectively the sealing ring and the rotatable outer shaft.

12. The assembly according to claim 1, wherein the retaining ring is an interference fit to the sealing ring.

13. The assembly according to claim 1, wherein the retaining ring is formed as a plurality of arc sections which are individually located on the retaining ring and then joined together to complete the retaining ring.

14. Coaxial rotatable inner and rotatable outer shafts fitted with the intershaft seal of claim 1.

15. An intershaft seal assembly, the intershaft seal assembly comprising:
- a rotatable inner shaft;
- a rotatable outer shaft, wherein the rotatable inner shaft and the rotatable outer shaft are coaxial, and the rotatable inner shaft and the rotatable shaft both rotate relative to each other;
- an intershaft seal that is located in an annular space between the rotatable inner shaft and the rotatable outer shaft, wherein the intershaft seal maintains an axial pressure differential between a fluid pressure on a first side of the intershaft seal and a different fluid pressure on a second side of the intershaft seal, the intershaft seal including:
  - a first runner which extends circumferentially around one of the rotatable inner shaft and the rotatable outer shaft and projects therefrom into the annular space, and
  - a sealing ring which is coaxial with both the rotatable inner shaft and the rotatable outer shaft and has a first end face, the first runner forming a first annular sealing interface with the first end face of the sealing ring;
  - wherein the sealing ring has a main body portion formed of a first material having a first coefficient of thermal expansion,
- a retaining ring fixedly fitted to an radially outward side of the main body portion of the sealing ring and formed of a second material having a second coefficient of thermal expansion, the second coefficient of thermal expansion being higher than the first coefficient of thermal expansion such that the retaining ring increases radial contraction of the sealing ring relative to the rotatable outer shaft on decreasing temperature, the retaining ring having a first anti-rotation formation projecting from an outer side of the retaining ring, wherein an outer surface of the first anti-rotation formation opposes an inner surface of the rotatable outer shaft.

16. The assembly according to claim 7, wherein one of the anti-rotation formations provides one or more male elements which mate with one or more corresponding female elements provided by the other anti-rotation formation.

17. The assembly according to claim 7, wherein the first anti-rotation formation is an arrangement of one or more flexible members which extend from the sealing ring to the rotatable outer shaft, and the second anti-rotation formation is an arrangement of corresponding attachment fixtures for the flexible members to the rotatable outer shaft, wherein the flexible members allow restricted rotation of the sealing ring relative to the rotatable outer shaft.

18. The assembly according to claim 1, wherein the retaining ring is press-fitted or shrink-fitted to the main body portion of the sealing ring.

19. An assembly for an intershaft seal, the assembly comprising:
a rotatable inner shaft;
a rotatable outer shaft, wherein the rotatable inner shaft and the rotatable outer shaft are coaxial, and the rotatable inner shaft and the rotatable outer shaft both rotate relative to each other,
wherein the intershaft seal is located in an annular space between the rotatable inner shaft and the rotatable outer shaft, wherein the shaft seal maintains an axial pressure differential between a fluid pressure on a first side of the intershaft seal and a different fluid pressure on a second side of the intershaft seal, the intershaft seal including:
a first runner which extends circumferentially around one of the rotatable inner shaft and the rotatable outer shaft and projects therefrom into the annular space, and
a sealing ring which is coaxial with the rotatable inner shaft and the rotatable outer shaft and has a first end face, the first runner forming a first annular sealing interface with the first end face of the sealing ring,
wherein the sealing ring has a main body portion formed of a first material having a first stiffness,
a retaining ring that is fitted to an radially outward side of the main body portion of the sealing ring so as to prevent relative rotation and that is formed of a second material having a second stiffness, the second stiffness being greater than the first stiffness such that the retaining ring reduces or prevents radial growth of the sealing ring relative to the rotatable outer shaft under centrifugal loading, the retaining ring having a first anti-rotation formation projecting from an outer side of the retaining ring, wherein an outer surface of the first anti-rotation formation opposes an inner surface of the rotatable outer shaft.

20. The assembly according to claim 1, wherein the outer surface of the retaining ring of the sealing ring contacts the inner surface of the rotatable outer shaft under centrifugal loading.

* * * * *